(12) United States Patent
Lee

(10) Patent No.: US 6,842,219 B2
(45) Date of Patent: Jan. 11, 2005

(54) MOVING PICTURE DECODING PROCESSOR FOR MULTIMEDIA SIGNAL PROCESSING

(75) Inventor: Seung Ho Lee, Seoul (KR)

(73) Assignee: C & S Technology, Seoul (KR)

( * ) Notice: Subject to any disclaimer, the term of this patent is extended or adjusted under 35 U.S.C. 154(b) by 331 days.

(21) Appl. No.: 10/195,575

(22) Filed: Jul. 15, 2002

(65) Prior Publication Data

US 2003/0117585 A1 Jun. 26, 2003

(30) Foreign Application Priority Data

Dec. 24, 2001 (KR) .......................................... 2001-83951

(51) Int. Cl.[7] .......................... G03C 11/00; G06T 1/60; H04N 7/12
(52) U.S. Cl. ................... 352/244; 345/530; 375/240.12
(58) Field of Search .......................... 352/244; 345/530, 345/531, 534; 375/240.12; 710/22; 712/41

(56) References Cited

U.S. PATENT DOCUMENTS 5,889,480 A * 3/1999 Kim .............................. 341/50
6,661,422 B1 * 12/2003 Valmiki et al. ............. 345/530

* cited by examiner

Primary Examiner—David Gray
Assistant Examiner—Arthur A Smith
(74) Attorney, Agent, or Firm—Harness, Dickey & Pierce, P.L.C.

(57) ABSTRACT

The present invention relates to a moving picture decoding processor for multimedia signal processing. In more detail, it relates to a moving picture decoding processor, based on RISC processor, having a separate bus structure for minimizing memory access. And thus, it can provide optimized systems for various application fields.

22 Claims, 14 Drawing Sheets

Figures 5, 6:
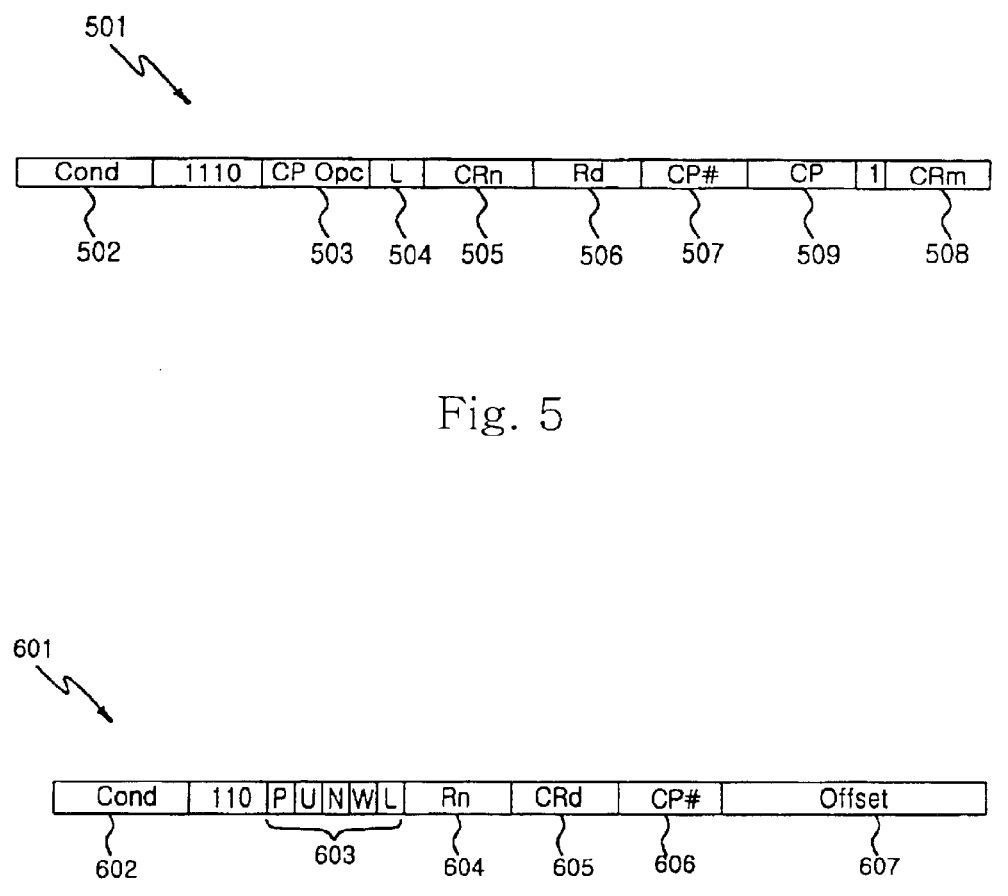

| Cond | 1110 | CP Opc | L | CRn | Rd | CP# | CP | 1 | CRm |

| Cond | 110 | P | U | N | W | L | Rn | CRd | CP# | Offset |

MOVING PICTURE DECODING PROCESSOR FOR MULTIMEDIA SIGNAL PROCESSING

BACKGROUND OF THE INVENTION

1. Field of the Invention

The present invention relates to a moving picture decoding processor for multimedia signal processing. In more detail, it relates to a moving picture decoding processor, based on RISC(Reduced Instruction Set Computer) processor, having a separate bus structure to minimize memory access. And thus, it can provide optimized systems for various application fields.

2. Description of the Related Art

Recently, as the multimedia-and-network-related technology has been developed, the concept of communication is no more limited to the voice transmission and/or simple data transmission but enlarged to a multidimensional scale including a moving picture signal and a complex media such as an Internet.

In particular, with the standards being established by organizations such as the International Telecommunication Union(ITU) or the International Standardization Organization(ISO), the demand for moving picture signal transmission is about to be highly increased.

The standards, that have been established up to now, for moving picture signal processing are JPEG(Joint Photographic Experts Group) by ISO, H.261/H.263 by ITU, and MPEG(Moving Pictures Experts Group) series by ISO.

They have different characteristics for different application fields respectively. JPEG is mainly applied to photo-CD, H.261/H.263 are to video phone and video conference, MPEG-1 is to CD-ROM, CD-I and computer application, and MPEG-2 is to digital broadcasting and video distribution.

In particular, MPEG-4 is established in 1998 for the purpose of setting a coding standard for a complex multimedia including a static picture, computer graphics, voice coding of analytic synthesizer, and a synthesized audio and text by MIDI(Musical Instrument Data Interface) as well as compressing and coding the conventional audio and moving picture signals. MPEG-4 covers a wide range of data from a simple profile of 64 Kbps to a main profile of 38.4 Mbps so that it can handle all the application fields of multimedia.

Moreover, as IMT-2000 technology, a so-called the 4-th generation telecommunication technology, is gradually universalized, a multimedia telecommunication integrating voices and moving pictures is about to replace the currently used conventional voice and data telecommunication.

Since MPEG-4 is currently being used as a core of these next-generation technologies, its importance is being increased.

In distinction from other moving picture signal processing technologies, MPEG-4 is employed in wireless communication circumstances. Particularly, considering that the application field of simple profile is portable terminal, it has to be emphasized that MPEG-4 can be embodied by a small-size circuit and provide stronger error resilience and lower power consumption compared with other moving picture signal processing technologies.

FIG. 1 is a view illustrating the structure of a general media processor used for moving picture processing.

A main processor(101) is a controller working as a CPU and it controls overall input/output and internal operations of a media processor(109).

Main processor has a limitation in its application fields, however, it has a characteristic that it can be modified and/or changed to perform some specific functions by various algorithms and upgrade itself thereby. So, it is generally designed to have a programmable structure rather than a fixed structure optimized for a specific function.

With this characteristic, a main processor(101) can execute a coded program designed for a specific function by using an internal program memory or an extra external memory.

The program is designed to perform various functions such as coding/decoding the basic moving picture signals, coding/decoding the voice signals, processing the interrupt signals generated by various peripheral devices, controlling for video display and video capture, communicating with a processor that works as an external host, separating the input voice/moving picture signals, and so on.

A main processor(101) is interfaced to the other blocks through a main bus(108), and the connection between the main processor(101) and the other blocks is controlled and arranged by bust arbitration.

The video capture section(102) receives moving picture signals through an external moving picture input device like a digital camera and stores them in a frame memory for encoding.

The video display section(103) transmits decoded moving picture signals to an external output device like an LCD.

All the decoding processes of moving picture signals are carried out by internal CODEC, however, various post processing can be performed at video display section(103) such as improving the screen resolution of decoded moving picture signals, controlling the size and the reference location of output moving picture, converting the format according to the type of output device, and so on.

A host interface(104) is used for the communication with an external host processor that controls the media processor (109) in FIG. 1 as a slave.

Generally, a host processor is a base band MODEM processor under the wireless communication circumstances, and it only carries out transferring the compound voice/moving picture signal, inputted from the interface with RF module and/or external devices, to the media processor (109).

An external memory interface(105) is used for interfacing with externally equipped memories, and generally includes a memory controller.

A video/audio CODEC(106) carries out coding/decoding voice/moving picture signals.

The video/audio CODEC(106) is the one in which an optimized coding/decoding algorithm is embodied by hardware and/or software in accordance with the application field of the media processor(109).

Peripheral devices(107) are additional devices for providing various interfaces of the system in which the media processor is being used, and generally include an inter IC controller(TIC), a timer, an universal asynchronous receiver/transmitter(UART), a clock controller, an interrupt controller, etc.

However, the above described media processor(109) has the following problems:

First, since the interfaces between the main processor (109) and the other blocks are formed by using only a single main bus(108), the load on the main bus(108) becomes larger and thus, it is difficult to improve the operation frequency.

Second, since the increase of main bus(108) load directly causes the increase of overall power consumption, the processor has difficulties in being applied to some application fields like a portable terminal.

Third, since all the blocks are interfaced by a main bus(108), the resource allocation of each block becomes inefficient.

SUMMARY OF THE INVENTION

The present invention is proposed to solve the problems of the prior art mentioned above. It is therefore the object of the present invention to implement a moving picture decoding processor, based on RISC processor, having a separate bus structure to minimize memory access, and thereby provide a moving picture decoding processor for multimedia signal processing, which is applicable for a video phone, PDA, or a wireless VOD terminal, and more particularly, is able to establish optimized systems for various application fields by using a programmable structure.

To achieve the object mentioned above, the present invention presents a moving picture decoding processor for multimedia signal processing comprising: an RISC processor for carrying out an overall control on decoding process of compressed moving pictures inputted from an external device; a video decoder(VDEC) for decoding moving pictures; a post processor for carrying out an appropriate post process on decoded moving picture signals according to the output device connected to external interface; a DSCU (Decoding Sequence Control Unit) DMA(Direct Memory Access) for interfacing the VDEC and an external memory; a post DMA for interfacing the post processor and an external memory; peripheral devices required for system application; a peripheral device DMA for interfacing the peripheral devices and an external memory; an external memory controller for controlling the external memory; a peripheral device bridge for interfacing the peripheral device control bus, to which the peripheral devices are connected, and a main bus; and a main bus, coprocessor bus and a peripheral device control bus, which are independent from one another and interfacing each component respectively.

A VDEC in accordance with the present invention comprises: a VLD(Variable Length Decoder) and an RVLD (Reversible Variable Length Decoder) for decoding the data compressed by Huffman coding; an MC(Motion Compensator) for carrying out a motion compensation; an IDCT/IQ(Inverse Discrete Cosine Transformer/Inverse Quantizer) for transforming the compressed moving picture coefficients into time-domain coefficients and carrying out an inverse quantization; an ADR for decoding compressed data by AC/DC coefficient prediction; a DEC memory for commonly being used for above described components; and a DSCU for controlling the sequence of each component.

In addition, a post processor in accordance with the present invention is characterized by carrying out the functions of on-screen display(OSD) for displaying additional characters with moving picture simultaneously, deblocking filtering on decoded moving picture, display control for generating appropriate control signal according to the type of external output device, interfacing with an external digital output device, and interpolation filtering on decoded moving picture.

Peripheral devices in accordance with the present invention include: a host interface for providing an interface with an external host processor; a WDT(Watch Dog Timer) for controlling software reset; a timer for providing count up/down; an ICU(Interrupt Control Unit) for processing various interrupts inputted from external devices; a PLL (Phase Locked Loop) for supplying clock to internal component; a GPIO(General Port Input Output) for being used for a general input/output port on system application; an IIC(Inter IC Controller) for providing an interface with an external video encoder/decoder; an IIS(Inter IC Sound Interface) for audio interface; a UART(Universal Asynchronous Receiver/Transmitter) working as a universal serial communication port; and an SPI(Serial Port Interface) for providing multichannel serial communication and being operated on master mode or slave mode.

BRIEF DESCRIPTION OF THE DRAWINGS

FIG. 5 is a view illustrating the structure of a coprocessor operation control command that controls a CODEC block in DSCU described in FIG. 4.

FIG. 6 is a view illustrating the structure of a coprocessor command used for external memory access of CODEC blocks in DSCU described in FIG. 4.

DETAILED DESCRIPTION OF THE EMBODIMENTS

Hereinafter, referring to appended drawings (FIG. 2~FIG. 20), the embodiments of the present invention are described in detail.

Figure 1:
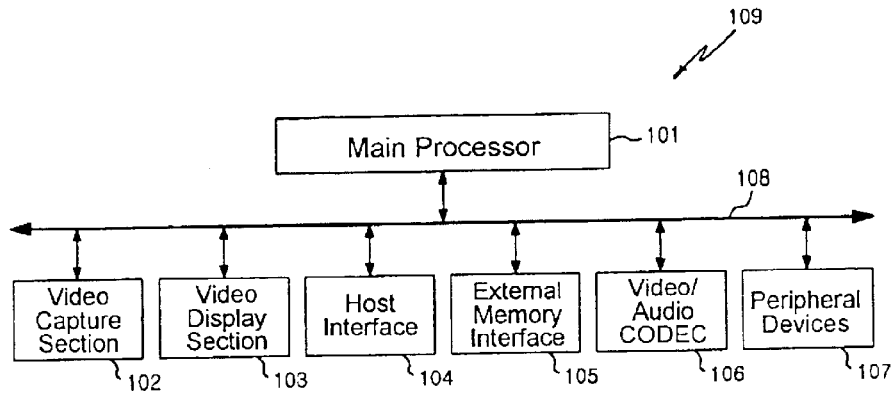
FIG. 1 is a block diagram illustrating the structure of a general media processor of the prior art.
Figure 2:
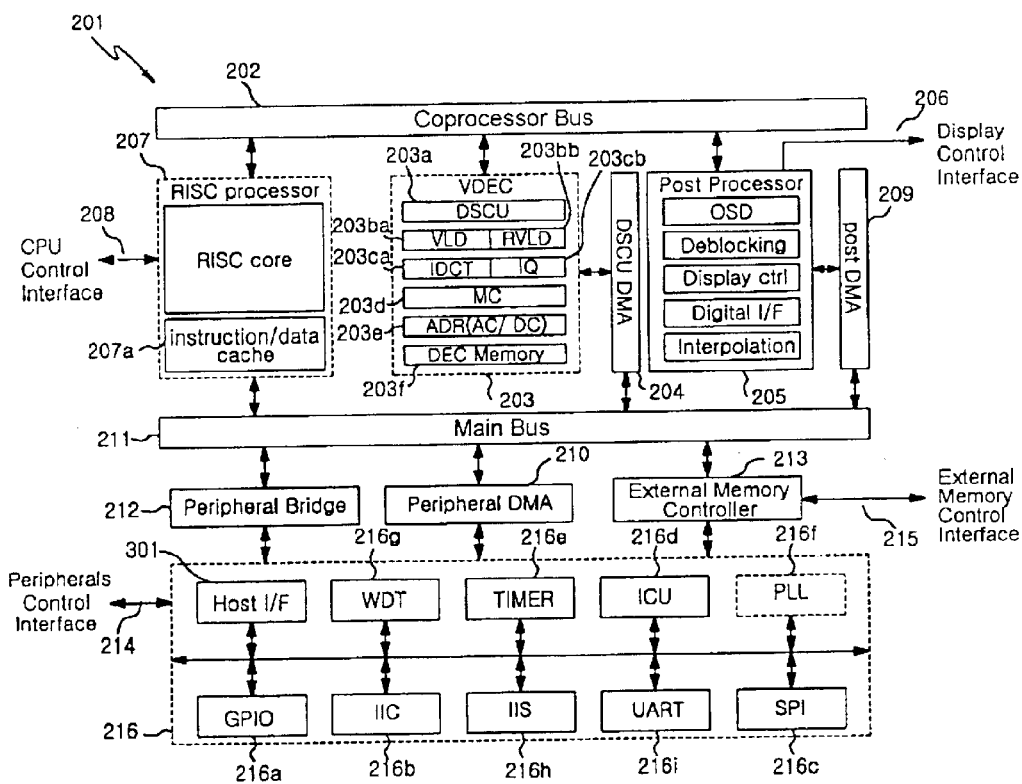
FIG. 2 is a view illustrating the overall structure of a moving picture decoding processor in accordance with the present invention.

FIG. 2 is a view illustrating the overall structure of a moving picture decoding processor(201) in accordance with the present invention.

An RISC processor(207) is embedded in the decoding processor(201) for using an optimized hardware and being applicable to various application fields.

The RISC processor(207) basically carries out an overall control on decoding process of compressed moving pictures inputted from external devices.

The RISC processor(207) has a instruction/data cache (207a) inside so that it can store a program required for system control without an extra memory. And, by using the program, it can effectively support various application tools when decoding processor(201) is applied.

The above mentioned program can be inputted from an external memory or an external host through peripheral devices(216) or an external memory control interface(215) at the time of decoding processor(201) booting. Since it uses the instruction/data cache(207a), it provides an environment to which a user can easily apply the appropriate tools regardless of the application program size.

In addition to the basic control on CODEC, the RISC processor(207) gathers the interrupts generated from various peripheral devices(216) and a post processor(205) and carries out corresponding interrupt routines.

A CPU control interface(208) is the interface for various external inputs used for controlling the RISC processor (207), and control signals related to Endian setting, external input/output control, test mode setting, etc. are connected thereto.

A certain amount of frame memory is required for moving picture decoding, which is for the frequently occurring cases if the previous frame is required during the decoding process.

Generally, accesses to the present or the previous frame memory are frequently required during a moving picture decoding process, and thus in the case of using a single system bus like in the prior art, the usage of the system bus is very inefficient.

In other words, if the blocks such as peripheral devices (207), DSCU DMA(204), and post DMA(209) are frequently using the bus for accessing the frame memory, the chances for the rest of the blocks such as peripheral device bridge(212) or peripheral device DMA(210) to use the bus becomes less, and thereby the overall system function can be degraded.

To solve this problem, the present invention minimizes the load of each block on the bus by separating a coprocessor bus(202) for internal CODEC control and a main bus(211) for external memory control and access.

The coprocessor bus(202) is a common bus only used between RISC processor(207), VDEC(203), and post processor(205), and it is independent from the other blocks.

The coprocessor bus(202) is mainly used for transferring exclusive coprocessor commands for controlling VDEC (203) and the post processor(205) and handshaking, and it is operated independently from the main bus(211).

Since VDEC(203) and the post processor(205) are connected to RISC processor(207) by a coprocessor interface respectively, an extra bus arbitration function is not required. Each inside block of VDEC(203) is designed to be equipped with an instruction interpreter so that it starts to be operated only when a specific command corresponding to each block exists on the coprocessor bus(202).

Main bus(211) is a bus providing an interface with an external memory, to which 4 masters and 2 slaves are connected.

Here, the 4 masters are RISC processor(207), DSCU DMA(204), a post DMA(209) and a peripheral device DMA(210) respectively, and the 2 slaves are an external memory controller(213) and a peripheral device bridge (212).

The bus access between the 4 masters and the 2 slaves is controlled by a bus arbitrator installed in the main bus(211).

Here, the bus arbitration is composed of the selection of bus master generating a bus request signal and the selection of a slave by address decoding.

The slave selection uses the upper 2 bits of the address generated at RISC processor(207), however, in the case that the bus master is the other block excluding the RISC processor(207), the slave is automatically assigned to the external memory controller(213).

Physically, 4 masters are connected to the main bus(211), however, considering the additional refresh process existing for the case of an external memory, like DRAM, being connected, total of 5 masters are actually being exist.

The bus access priority is assigned to these 5 masters according to their characteristics. In case of using an external DRAM, the refresh process has the highest priority and the priorities are assigned to the rest by the turn of peripheral device DMA(210)→post DMA(209)→DSCU DMA(204) →RISC processor(207).

Since 7 cycles are required for the external DRAM refresh process based on main clock, 2 cycles are required based on bus clock.(Since 4 cycles are required for accessing one word from external memory based on main clock, these 4 cycles are defined as 1(one) bus cycle.

In case of peripheral device DMA(210), the buffer can store maximum of 20 words. So, if the maximum usage is assumed, maximum of 20 bus cycles are required.

In case of post DMA(209), since the line reading operation for online screen display requires the largest memory access, if we assume that it accesses maximum 360 pixel data(based on QCIF size), 45 bus cycles are required.

In case of DSCU DMA(204), since one block of moving picture data, i.e. 8×8 pixel data, has to be processed by a series of memory access for motion compensation, if we assume that it accesses maximum 9 lines with maximum 9 bytes in each line, maximum of 27 bus cycles are required.

RISC processor(207) requests for a memory access when it needs to carry out a cache fill because of an internal instruction/data cache(207) miss occurring. At this time, accesses are made of 4 words unit which takes one line of cache, and thus, maximum of 4 bus cycles are required.

For increasing the usage of the main bus(211), VDEC (203) and the post processor(205) can access the bus only through DSCU DMA(204) and post DMA(209) respectively. With this feature, the present invention provides an advantage that it limits the access of the bus, and at the same time, it minimizes the access time by using burst access even when the bus is allowed to be accessed.

VDEC(203) carries out decoding a moving picture compressed by H.263/MPEG-4 standard.

VDEC(203) comprises a decoding sequence control unit (DSCU; 203a) for controlling the overall decoding procedures, a variable length decoder(VLD; 203ba) for bit stream parsing of inputted compressed data, a reversible variable length decoder(RVLD; 203bb) for providing error resilience capability, an inverse discrete cosine transformer (IDCT; 203ca) for carrying out frequency-time domain transformation for each pixel, an inverse quantizer(IQ; 203cb) for inverse quantization on quantized input pixel data, a motion compensator(MC; 203d) for decoding a current frame by using the correlation with the previous frame data, an ADR(203e) for estimating a current DC or AC coefficient value by using the DC or AC coefficient value of adjacent macroblock in case that an INTRA macroblock is inputted from MPEG-4, and a DEC memory(203f) for commonly being used for above described components during the moving picture decoding procedures.

Each block carries out a corresponding function independently, and the operation timing is decided by a pipeline controlled by DSCU(203a).

The post processor(205) takes charge for post processing by which a moving picture decoded by VDEC(203) is outputted to an external display device.

Since the functions included in the post processor(205) can be set to have various compositions according to the applied system specification and/or the user demand, it can be optimized for a specific application by embodying the independent functions in hardware and the composition of the functions to be programmable.

The functions of post processor(205) includes a function of display control interface(206) for controlling the external display device, a function of on-screen display(OSD) displaying additional characters with moving picture simultaneously for providing the function of graphic user interface (GUI), a function of deblocking filter designed to reduce the blocking effect possibly occurred between macroblocks during a moving picture decoding process, a function of interpolation filter used for controlling the size of moving picture screen displayed on an external display device, and so on.

Various input/output display control interfaces(206) connected to the post processor(205) include an address/data line required for data transmission with external display devices, and in addition, they include HSYNC/YSYNC signals used for display device synchronization and an exclusive post processor clock, etc.

The external memory controller(213) is equipped for controlling the frame memory to be externally installed. Both coprocessor bus(202) and main bus(211) have the size of 32 bits data bus, however, an external memory interface can be variable from 8 bits to 32 bits.

Inside of the external memory controller, ROM type memory control as well as external frame memory control is being carried out. It is because ROM type memory can also be used for program download at the time of initial system booting.

According to the type and the number of bits of an external interface of the external memory controller(213), it carries out a format conversion(process of word-unit data generation by collecting byte-unit data) for data synchronization and provides burst mode access in accordance with the data transmission size of each master processor(RISC processor(207), DSCU DMA(204), post DMA(209), or peripheral device DMA(210)).

In addition, in the case of a DRAM-type memory being used, an auto refresh mode is selected for refreshment and carried out at every (9.5+A) $\mu$sec (Here, A is delay time for bus access and has maximum of 3.3 $\mu$sec.).

The external memory interface(215) is an input/output used for controlling an external memory, i.e. DRAM or ROM type memory. In case of DRAM type memory being used, it includes signals such as column address strobe (CAS), row address strobe(RAS), clock, write enable, address bus, data bus, chip enable and DQM, and signals of memory select and write enable related to ROM control.

The peripheral device bridge(212) is a bridge for connecting various peripheral devices(216) to the main bus (211).

The peripheral device bridge(212) is a slave from the viewpoint of main bus(211), however, it works as the only master from the viewpoint of local bus of the peripheral device(216).

The peripheral device bridge(212) converts bus transaction of main bus(211) into bus transaction of peripheral device(216), and at the same time, it generates strobe signals required for data transmission and signals required for peripheral device(216) selection by decoding the main bus (211) address.

The peripheral device DMA(210) is a DMA block used for the case when an external memory access is required among the devices included in peripheral devices(216).

The peripheral devices(216) are devices having various functions required for system application and carry out data transmission through an independent local bus.

The general purpose input/output(GPIO; 216a) is a general input/output port applicable for various purposes at the time of system application.

A user can set an input/output mode with register setting by a program, and if necessary, it can be used as an open-drain.

Therefore, for using the GPIO(216a), the required environments should be set in advance such as the input/output direction, setting of open-drain or push-pull, masking by interrupt mask setting, and enable bit setting of interrupt controller, etc.

The inter IC controller(IIC; 216b) is a kind of serial bus controller providing an effective connection to an LCD driver, EEPROM, and a remote I/O port by using minimum number of pin.

The IIC(216b) uses self-generating serial clock, SCL, and transmits data through SDA pin.

The serial port interface(SPI; 216c) is a peripheral device providing a multichannel serial communication. It is operated by either master mode or slave mode and provides up to 64 Kbps transmission speed.

The interrupt control unit(ICU; 216d) arranges various interrupts generated from exterior of the decoding processor (201) in accordance with the present invention and the interrupts generated inside of the peripheral devices(216) and transfers them to RISC processor(207).

An enable mask and a flag bit are included in each interrupt source to disable or enable the corresponding source.

The timer(216e) includes a timer for carrying out count up/down by a specific bit unit, and it is used for various timing references at the time of system application.

The phase locked loop(PLL; 216f) receives an external low-frequency clock and provides more stable high-frequency clock to interior.

The watch dog timer(WDT; 216g) generates a software reset after a certain preset time being passed, in case of a system malfunction, by using its self-timer function.

The inter IC sound interface(IIS; 216h) is a serial interface providing a 16 bit- or 18 bit-audio data communication. It provides both left-justified mode and right-justified mode, which are generally provided by most stereo audio CODEC, as well as a general IIS mode.

The universal asynchronous receiver/transmitter(UART; 216i) is a general serial communication port.

Figure 3:
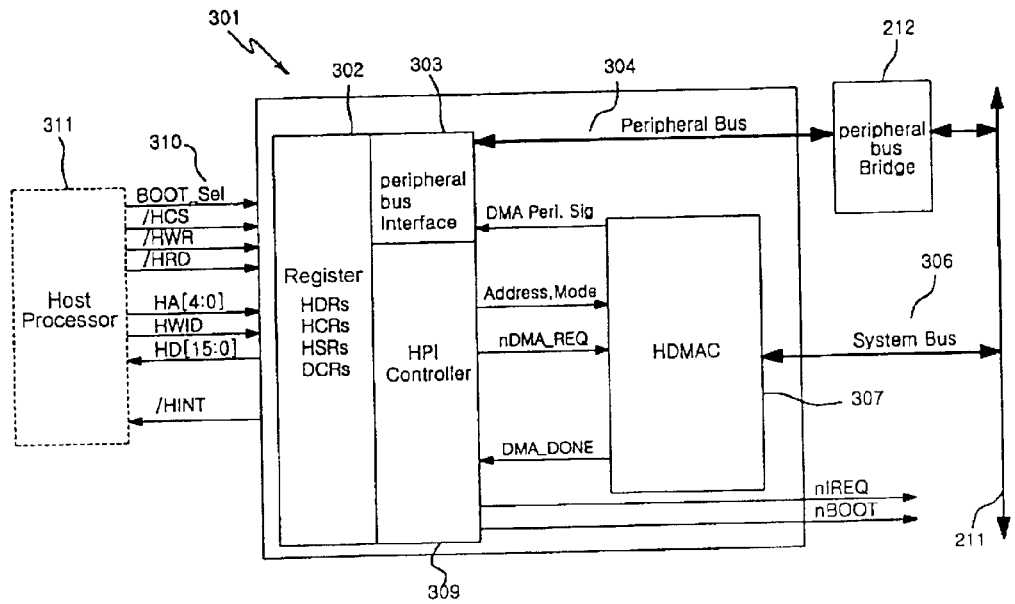
FIG. 3 is a block diagram of a host interface in accordance with the present invention.

FIG. 3 is a view illustrating the structure of a host interface among the peripheral devices(216) described in FIG. 2.

The host interface(301) provides a path for receiving compressed bit stream or an application program download from an external host processor.

For providing a two-way data transmission, from the external host processor(311) to the host interface(301) and from the host interface(301) to the external host processor(311), the host interface(301) has 20 32 bit data registers. In addition, Endian conversion for providing a format conversion with the host processor(311) is possible.

Since the host interface(301) is internally equipped with an exclusive DMA controller like HDMAC(307), it is effectively used for transferring the inputted data to system bus or transmitting the data to the host processor(311).

It also provides a command register for providing an internal debugging and message reception/transmission with the host processor(311).

The host interface(301) is connected to the exterior by a signal(310), of which the address bus is 5 bits and the data bus is 16 bits. For simplifying the communication with the host processor(311), a handshaking signal is not exchanged.

The above described host interface(301) carries out the following functions:

First, it downloads a program from the host processor(311).

Second, it receives compressed bit stream from the host processor(311).

Third, it transmits necessary data to the host processor(311).

Fourth, it carries out data format conversion at the time of data exchange between the host processor(311) and the decoding processor(201).

Fifth, it generates an interrupt when the embedded buffer is completely filled up or totally empty at the time of data transmission/reception.

Sixth, it provides a register, independent of data transmission with the host processor(311), for exchanging a command or a message, and in particular, it generates an interrupt at the time of command transmission/reception to provide an easy debugging.

Seventh, it uses a DMA at the time of data exchange with the host processor(311).

HDMAC(307) provides a process on the data received from the host processor(311) or the data to be transmitted from the decoding processor(201) to the host processor(311) without an intervention of RISC processor(207).

HDMAC(307) generates an triggering event to start DMA operation when the 20 buffers embedded in the host interface(301) are completely filled up or totally empty.

Particularly, HDMAC(307) takes part in booting process of the decoding processor(201) as well as data exchange with the host processor(311). If the host processor(311) starts to request for using a certain amount of data under the state that the value of BOOT_Sel signal, among the signal(310), is '1', the HPI controller(309) starts a host boot process to store the data inputted from the host processor(311) into the external memory and try a system booting.

If the request for using DMA is inputted under the state of BOOT_Sel signal being '0', HDMAC(307) reads a certain amount of data from exterior(an external input/output port generally connected to FLASH memory, connected through system bus(306)), transmits the data to the external memory, and starts a ROM boot process thereafter.

The system bus(306) represents a data/address line connected to HDMAC(307) and the main bus(211) described in FIG. 2.

The peripheral device bus(304) is a local bus commonly used for various devices internally installed in the peripheral device section(216) described in FIG. 2.

The peripheral device bus interface(303) generates a bus control interface signal required for the host interface(301) to communicate through the peripheral device bus(304).

The HPI controller(309) generates various signals for controlling the host interface(301) and external interrupts. The register(302) represents a buffer-register used for data exchange with the host processor(311).

Figure 4:
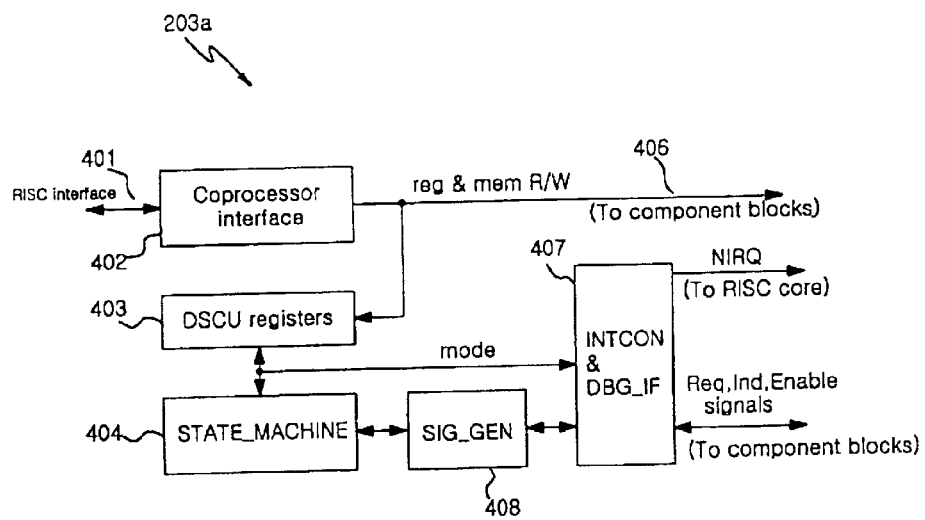
FIG. 4 is a block diagram of a decoding sequence control unit(DSCU) in accordance with the present invention.

FIG. 4 is a block diagram of DSCU(203a) of VDEC(203) described in FIG. 2, which controls the operation sequence of each functional blocks during a moving picture decoding by a macroblock level, manages the interrupts generated at each blocks, and provides an interface with RISC processor (207).

The coprocessor interface(402) controls the interface for connecting RISC processor(207) and VDEC(203) or the blocks of the post processor(205).

The coprocessor interface(402) interprets the coprocessor command data generated from RISC processor(207) by using the data, address and control signals inputted/outputted through RISC interface(401)

Next, it decides whether the data is required for register read/write of a certain block or for DEC memory(203f) access, and thereafter generates appropriate control signals to the blocks and distributes them.

DSCU register(403) is for storing the data related to various control signals generated in case of register and memory read/write(406). And at the time of read/write of the DEC memory(203f), which is a local memory, it stores the control data for assigning the start address and the end address of the memory to be used.

The state machine(404) is a finite state machine(FSM) for controlling the operation of DSCU(203a). INTCON & DBG_IF(407) and SIG_GEN(408) receive the interrupt request signals generated from the blocks of VDEC(203), and at the same time, produce various control signals generated for each block.

Here, the interrupt requests generated from the blocks are inputted to RISC processor(207) through INTCON & DBG_IF(407).

FIG. 5 and FIG. 6 are views illustrating the coprocessor command sets used at the coprocessor interface(402).

FIG. 5 shows a command(501) format used for reading or writing the register of each block included in VDEC(203) in FIG. 2.

Cond(502) is a condition sector used for deciding whether carrying out the command or not, and CP Opc(503) is an identification sector for identifying each block.

The identification sector(CP Opc; 503) is composed of 3 bits, such that the value of 000 represents DSCU(203a), 001 for VLD(203ba), 010 for RVLD(203bb), 011 for ADR (203e), 100 for IDCT(203ca), 110 for MC(203d), and 111 represents the post processor(205).

L(504) is used for classifying register read or write, and CRn(505) represents the upper 4 bits of register address to be used.

Rd(506) represents the number of register presently to be used among the internal registers of RISC processor(207), and CRm(608) represents the lower 4 bits of register address to be used.

CP#(507) and CP(509) are fields left for using the possible future-extended functions.

FIG. 6 shows a command format used for the blocks included in VDEC(203) to read or write an external memory.

Since the internal blocks of VDEC(203) cannot be directly connected to main bus(211), if these blocks need to use an external memory, it should inform to RISC processor(207) by using a command(601), and then RISC processor(207) can access data through main bus(211).

Similar to FIG. 5, Cond(602) is a condition field used for deciding whether carrying out the command or not, and P/U/N/W/L(603) decides memory reading or writing.

Rn(604) represents an internal register of each block, and CRd(605) decides that which memory is to be used.

CRd(605) is composed of 4 bits, such that 0000 for external memory, 0001 for internal DEC memory(203f) of VDEC(203), 0010 for local memory used for ADR(203e) inside of VDEC(203), 0011 for local buffer of IQ(203cb) used inside of VDEC(203), 0100~0101 for local memory used for MC(203d) inside of VDEC(203), and 0110~1101 represent the local memory of the internal block of the post processor(205).

Offset(607) is the value of immediate offset used for memory access, and CP#(606) is a field left for using the possible future-extended functions.

Figure 7:
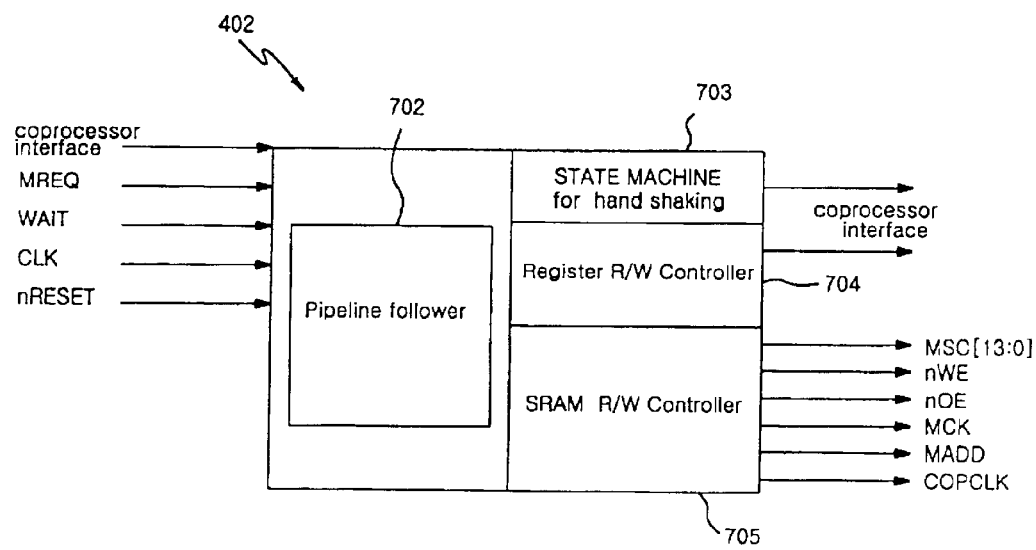
FIG. 7 is a view illustrating the structure of a coprocessor interface block used for communication between CODEC blocks in DSCU described in FIG. 4 and an RISC processor.

FIG. 7 is a view illustrating the structure of the coprocessor interface(402) described in FIG. 2.

The pipeline follower(702) decides the following operation according to each pipeline step of RISC processor(207).

The register read/write controller(704) and the external memory read/write controller(705) generate control signals used for controlling each block register of VDEC(203) or memory reading/writing respectively.

At this time, RISC processor(207) snoops the pipeline stage related signals generated from each coprocessor for coprocessor interface(402), and the state machine(703) carries out generating these signals fit for each block included in VDEC(203).

There are 4 different states for handshaking with RISC processor(207), and an appropriate state transition is being carried out according to the state of coprocessor.

The 4 states are: no coprocessor; coprocessor being exist but unable to carry out a command immediately; able to carry out a coprocessor command immediately but more execution cycles are required for operation being ended; and coprocessor command operation ended.

Figure 8:
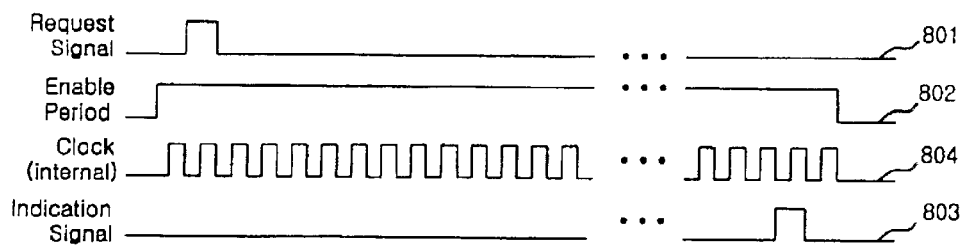
FIG. 8 is a timing chart of the signals for controlling CODEC blocks in DSCU described in FIG. 4.

FIG. 8 is a timing chart illustrating the input/output signal relation between DSCU(203a) and the blocks of VDEC(203) described in FIG. 2.

DSCU(203a) basically carries out a sequential sequence control, outputs an operation start signal(801) and enable interval signal(802) of each block, and receives an indication signal(803) informing the operation end of each block.

During normal operation, it generates an interrupt when the decoding of one macroblock is completed. And in case of state monitoring or trying to replace an operation of a specific block by a software, it can be set to generate an interrupt at the time of beginning or ending of the clock (804).

In addition, if an error occurs during each block operation, it stops all the ongoing operations and generates an interrupt.

Since each block is operated by clock being supplied during an enable interval signal(802) only, all the unselected blocks are disabled and thus, the overall power consumption can be reduced.

After receiving an indication signal(803), DSCU(203a) generates a request signal indicating an operation of the next block.

Figure 9:
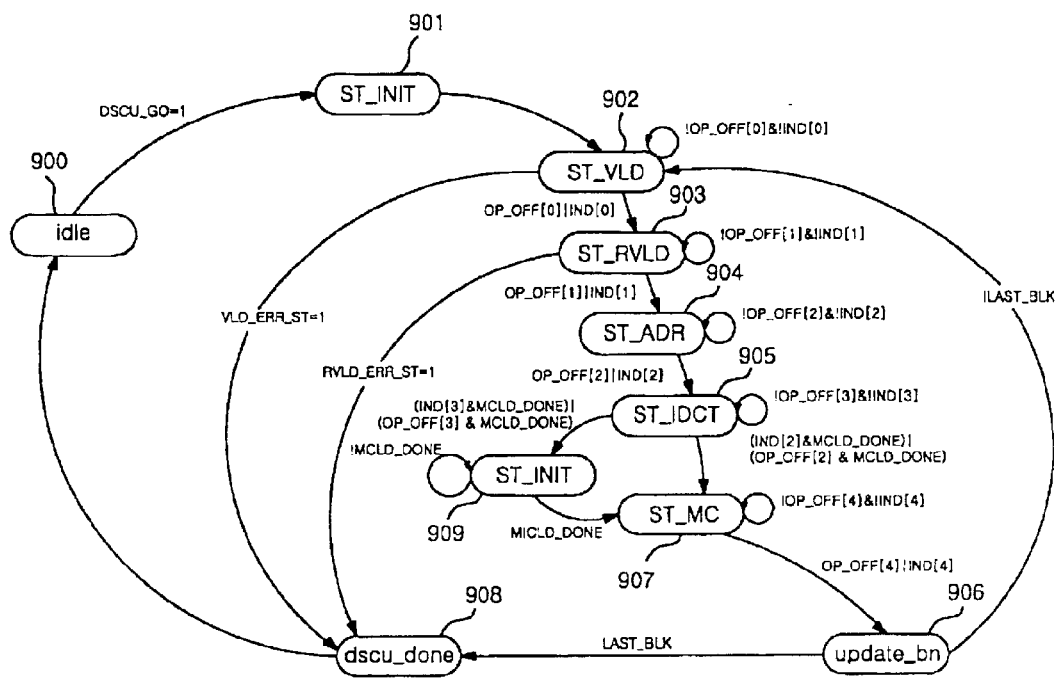
FIG. 9 is a view illustrating the state transition used for DSCU described in FIG. 4 controlling the inside CODEC blocks.

FIG. 9 is a state transition diagram of DSCU(203a).

ST_INIT(901) is a state of starting a macroblock-unit decoding, wherein the number of block to be processed is '0' for the case of forward decoding by using VLD(203ba) and '5' for the case of backward decoding by using RVLD (203bb).

The variable, OP_OFF[N], which is used for state transition, appeared in FIG. 9 represents a normal operation with '0' and the corresponding operation not being carried out with '1'.

Here, N represents each block, wherein '0' for VLD (203ba), '1' for RVLD(203bb), '3' for ADR(203e), '4' for IDCT(203ca), and '5' represents MC(203d) respectively.

Therefore, ST_VLD(902), ST_RVLD(903), ST_ADR (904), ST_IDCT(905), and ST_MC(907) are indicating the states that VLD(203ba), RVLD(203bb), ADR(203e), IDCT (203ca), and MC(203d) are enabled and a specific function is being carried out respectively.

ST-WAIT(909) represents a standby state until the data reading process is completed when a reading process is being carried out on the pixel data of the previous frame and the current frame required for motion compensation.

dscu_done(908) is the state representing that a decoding process on one macroblock is completed, and it generates an interrupt for indicating all the decoding processes are completed.

update_bn(906) is the state increasing the number of block when one block, among the 6 blocks in one macroblock, is completed, and transiting to the decoding process of the next block.

idle(900) is the state representing that DSCU(203a) is standing-by. When the start of DSCU(203a) is informed by register setting, it is transitted to ST_INIT(901) state to start decoding process.

The internal interrupt controller of DSCU(203a) is set to generate an interrupt at the time of start/end of each block. Tn addition, an interrupt can be generated either the decoding is completed for one macroblock or the operation is stopped by an error.

Besides, it receives an interrupt which is issued because the input buffer of VLD(203ba), in which the bit stream is stored, is empty, or an interrupt request from the post processor(205), and inputs these information to the interrupt-related pin of RISC processor(207).

Figure 10:
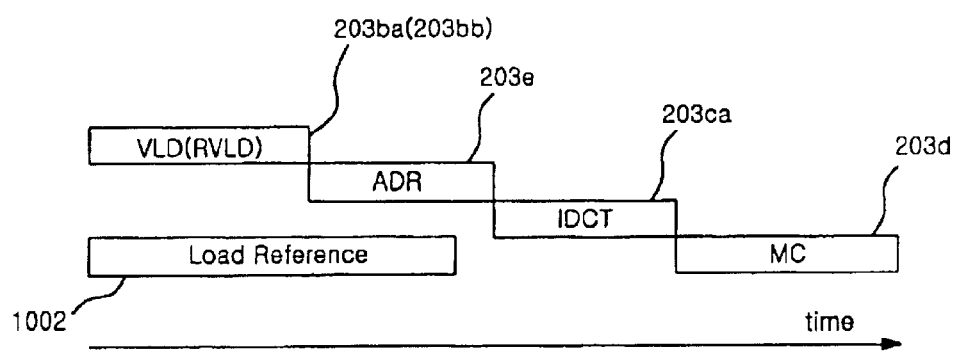
FIG. 10 is a view illustrating the structure of pipeline used for DSCU described in FIG. 4 controlling the CODEC blocks.

FIG. 10 is a view illustrating the structure of decoding pipeline of DSCU(203a).

According to the standard decoding process related to moving picture, such as H.263/H.261 or MPEG-4, DSCU (203a) divides the pipeline stages into VDA(203ba)(or RVLD(203bb))→ADR(203e)→IDCT(203ca)→MC(203d). According to the above described control signal of DSCU (203a), a corresponding block is enabled and thereby a moving picture decoding is sequentially being carried out.

Here, while VLD(203ba)(or RVLD(203bb)) and ADR (203e) are being operated with a load reference(1002), an access to an external frame memory is not required, and thus the overall decoding time can be minimized by accessing in advance the data of the previous frame and the current frame to be used at motion compensation step.

VLD(203ba) in VDEC(203) is a hardware used for decoding a bit stream coded by Huffman method.

VLD(203ba) processes a compressed bit stream not by a bit unit but by a code unit.

For that, before decoding the signal values previously stored in the buffer of VLD(203ba), a bit stream of the same number of bits as those of the previously decoded code at the buffer has to be inputted to the buffer by using a barrel shifter.

Since VLD(203ba) in VDEC(203) decodes texture information only(Actually, since the header information such as a picture header and a macroblock header is processed by software in RISC processor(207), VLD(203ba) does not need to process these information.), decoding is carried out by using a corresponding table of AC coefficient or DC coefficient according to the mode of macroblock to be processed.

Figure 11:
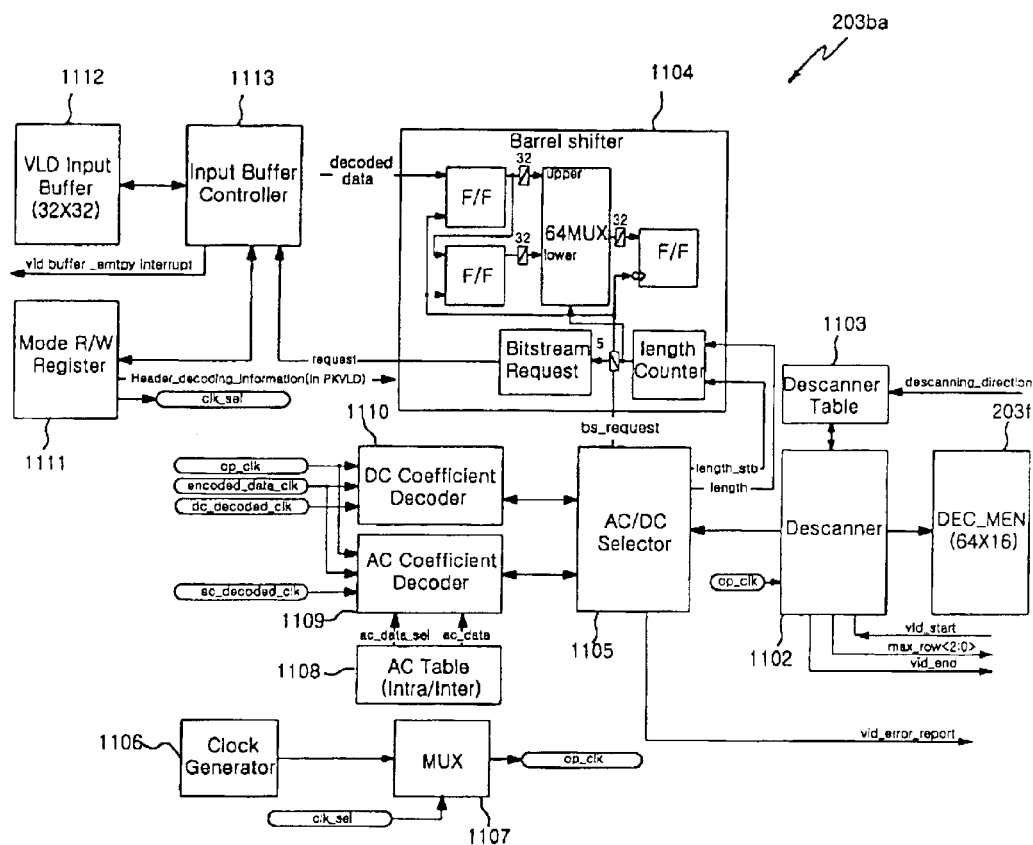
FIG. 11 is a view illustrating the structure of a variable length decoder(VLD) in accordance with the present invention.

FIG. 11 is a block diagram illustrating the structure of VLD(203ba).

For effectively using the data stored by 32 bit-unit in the input buffer(1112) of VLD, it employs a 64 bit-buffer in the barrel shifter(1104). And then, whenever the number of decoded data bit exceeds 32, it moves the lower 32 bit data of the barrel shift(1104) into the upper 32 bit location, and at the same time, fills the lower 32 bit with new data by requesting a bit stream to the input buffer(1112) and increases the address of the input buffer(1112) by one thereafter.

Here, if the increased value is equal to a pre-stored value of the buffer size(the size representing the low limit of the buffer), it informs DSCU(203a) that the buffer is empty. Then, DSCU(203a) checks the situation under which the signal(information) is generated and generates an interrupt to RISC processor(207).

At the same time, VLD(203ba) initializes the address of the input buffer(1112) to be '0' and stands-by until it receives a command from DSCU(203ba) to resume decoding.

The input buffer controller(1113) generates control signals related to memory access for bringing the bit stream stored in the input buffer(1112) by 32 bit unit and receives the information on the initial start location of the bit stream from RISC processor(207) for decoding the texture information, and when decoding is completed, informs RISC processor(207) the location of the bit stream up to which decoding is completed.

In addition, it inspects the pre-stored bit stream, and in case that it is short for processing one code, generates an interrupt indicating the input buffer(1112) being empty.

The barrel shifter(1104) rearranges the 32 bit data outputted from the input buffer controller(1113) for processing one code and transmits them to decoding block. It comprises two 32 bit registers and 64 MUXs.

The DC coefficient decoder(1110), the AC coefficient decoder(1109) and the AC table(1108) compare the 32 bit-unit data with a code stored on the table according to the operation mode and find a corresponding entry.

During the comparison process, if there is no entry on the table for the input data, it informs RISC processor(207) that an error occurs, and VLD(203ba) enters into the stand-by state.

The comparison process is performed by first checking whether the input data is an escape code by using the upper 7 bits of the input data, next dividing the upper 12 bits into 3 sectors each of which comprises 4 bits, and then by using this data, dividing the table into 8 groups.

Here, an input data itself becomes a selection factor in a group, and thus a corresponding code can be found very quickly.

The DC coefficient decoder(1110) is a block being operated only for the case of using an INTRA DC table by MPEG-4 specification.

The descanner table(1103) and the descanner(1102) carry out descanning of VLD(203ba) or RVLD(203bb) and scheduling of each sub-block for overall operation control on VLD(203ba).

When a decoding start signal is inputted from DSCU (203a), it outputs decoding request signals to the DC coefficient decoder(1110), the AC coefficient decoder(1109) and the AC table(1108) respectively for writing the decoded data on DEC memory(203f) and starts decoding.

And, with increasing the pointer of DEC memory(203f) by one whenever each decoding process is completed, it stores the code, found on the DC coefficient decoder(1110), the AC coefficient decoder(1109) and the AC table(1108), to the input buffer(1112).

During the process, when the processes on 8×8 blocks are completed, it checks the final last signal which is the decoding result of the AC table(1108) and the AC coefficient decoder(1109).

If the value of the final last signal is "1", it informs DSCU(203a) that VLD(203ba) operation is completed normally. If the value is "0", which means that decoding is not carried out normally, it informs DSCU(203a) that an error occurs and terminates VLD(203ba) operation.

In case of MPEG-4, the following 5 modes are used in VLD(203ba), and the decoding procedures are somewhat different according to each mode.

The 5 modes are:

first, resync marker enable with data partitioned and VLD used mode, second, resync marker enable with data partitioned and RVLD used mode, third, resync marker enable with data combined and VLD used mode, fourth, resync marker disable with VLD used mode, and fifth, short video header mode(H.263 mode).

RVLD(203bb) of VDEC(203) provides a function of backward decoding for improving the error resilience.

In case that an error exists in an inputted moving picture stream, if an error is found during the forward decoding process, RVLD(203bb) carries out backward decoding, starting at the endpoint of the corresponding video packet, to maximize the number of decodable bit streams.

By using RVLD(203bb) along with VLD(203ba), it is possible to localized the error-occurred location in some extent even when an error occurs. And so, if there is a sector, judged not to contain an error, among the video packet, a normal decoding can be carried out on the sector.

Here, the localizing extent of an error-occurred location is decided by the distribution of the length from the location at which an error actually occurred to the location at which RVLD(203bb) detects the error.

If using the RVLD(203bb) as described above, the length from the error-occurred location to the error-detected location is comparatively short and mostly within a certain length. Therefore, the block can be effectively separated by cache without an error.

Among the unexplained numerals, 1105 represents an AC/DC selector, 1106 represents a clock generator, and 1107 represents a multiplexer.

Figure 12:
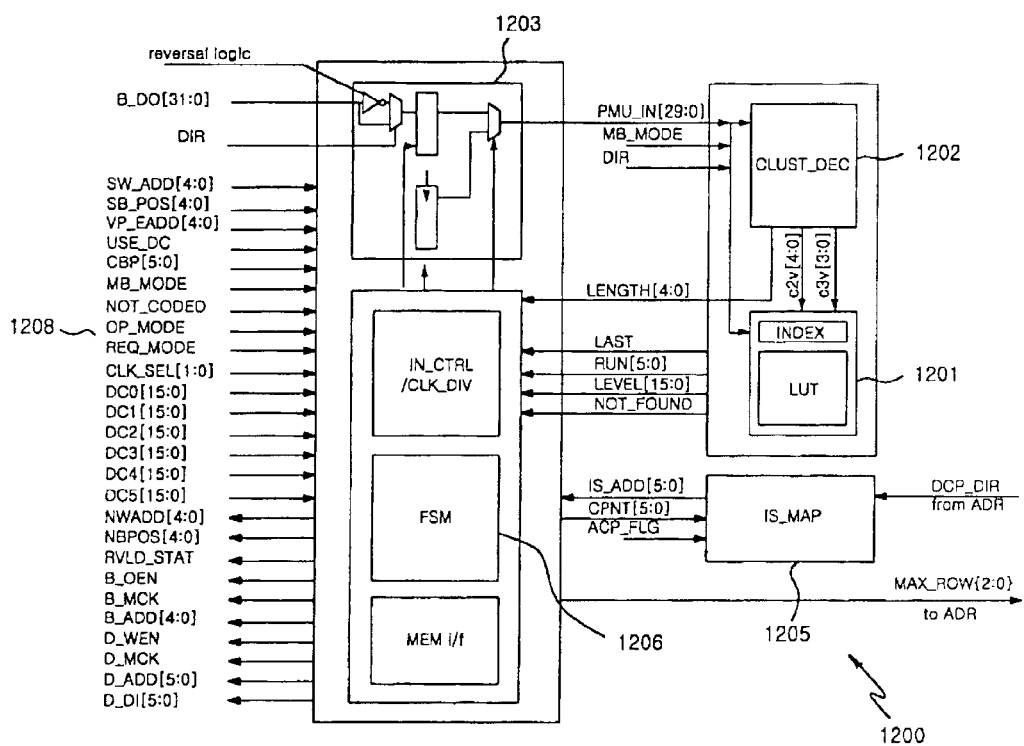
FIG. 12 is a view illustrating the structure of a reversible variable length decoder(RVLD) in accordance with the present invention.

FIG. 12 is a view illustrating the structure of RVLD (203bb) having the above described function.

The input buffer section(1203) comprises two 32 bit registers(1302, 1303), 64 32 bit MUXs(1301), and a control section(1306) for generating the memory address and control signals.

Figure 13:
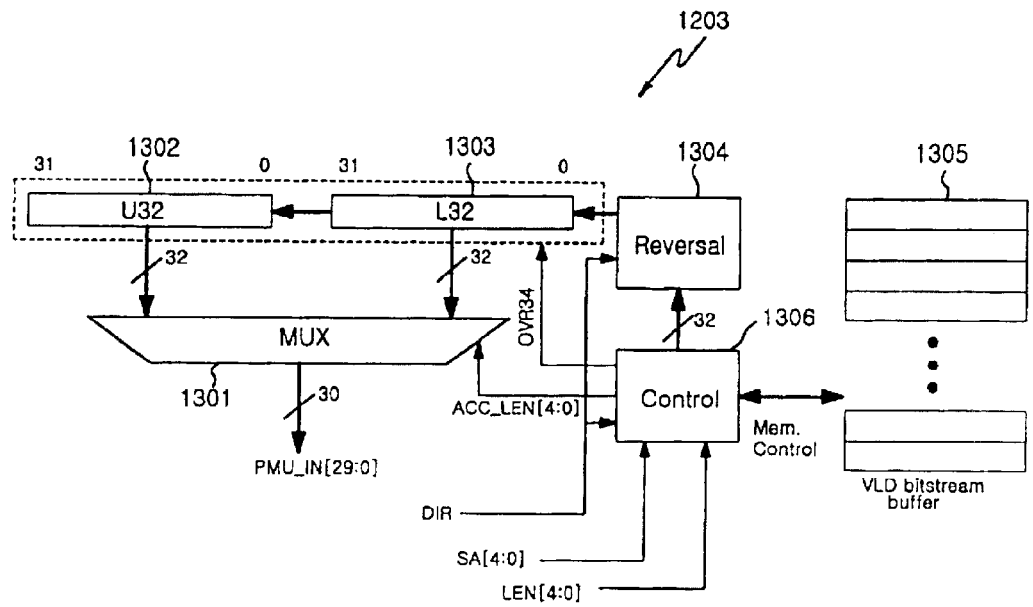
FIG. 13 is a circuit diagram illustrating the circuit for input data receiving and decoding in RVLD described in FIG. 12.

FIG. 13 is a view illustrating the detail structure of the input buffer section(1203).

In FIG. 13, the registers, U32(1302) and L32(1303), represent the upper and the lower 32 bits of input data respectively. The MUX(1301) produces data to be inputted to CLUST-DEC(1202) in FIG. 12 according to the value of ACC_LEN.

The signal, SA[4:0], to be inputted to the control section represents the address at which a bit stream to be decoded starts. And, DIR represents a decoding direction and LEN represents the length of the previously decoded code word.

Especially, the value of LEN is continually accumulated, and the accumulated value appears on ACC_LEN.

The ACC_LEN signal is used for selecting a 32 bit data among U32(1302) and L32(1303).

In case that ACC_LEN is more than 34 bits, L32(1303) is moved into U32(1302), the value of the following address is inputted from memory, and the value of ACC_LEN is renewed by ACC_LEN-32.

A cluster decoder comprising a CLUST-DEC(1202) and a look-up table(LUT; 1201) produces an LUT index stored by classifying code words by their characteristics and the length of decoded code word.

A cluster is largely divided by 3 sectors, and the value of upper N bits, when a code word is extended to be 16 bits, becomes the first cluster value(C1V).

The second cluster is arranged to have the pattern like A(for example). Here, the decoding value(C2V) of the second cluster is number of consecutive '1' or '0' excluding the upper N bits corresponding to the first cluster.

The third cluster also has the pattern of A, and the number of consecutive '1' or '0' excluding the bit lines corresponding to the first and the second clusters becomes the third cluster value(C3V).

With the values of above described C1V, C2V, and C3V and consulting the look-up table(1201), it generates an index and the length.

FSM(1206) controls the operation sequence of RVLD (203bb).

RVLD(203bb) carries out scanning and/or decoding by using the control signal from FSM(1206) and performs rewinding at the time of backward decoding.

In case of the input buffer(1112) being empty, it stops the operation until the input buffer(1112) is filled with a bit stream. And in case that an error occurs during the decoding, it sets the corresponding flag to be '1' and terminates the operation.

In the MPEG-4 moving picture decoding algorithm, for improving the decoding efficiency, only the difference value, calculated by using the DCT coefficient of adjacent upper block or left block, is variable-length coded instead of the DCT coefficient being directly variable-length coded.

This process is called by AC/DC coefficient prediction, and ADR(203e) of VDEC(203) carries out an inverse process of this one.

Among the unexplained numerals, 1304 represents a reversal section and 1305 represents a VLD bit stream buffer.

VDEC(203) carries out an error detection and concealment by using a software being executed in RVLD(203bb), MC(203d) and RISC processor(207).

An error detection is carried out by using the above described RVLD(203bb), and an error concealment is carried out in each macroblock by the following control modes according to the type of error occurrence.

The type of error that can be occurred in the macroblock currently being processed are divided by 13 modes according to the conditions that: Is the type of macroblock 'INTRA' or 'INTER'?; Is there a DC component in the inputted data packet header?; Is it possible to use the DC coefficient from the block located at the adjacent upper location of the present macroblock?

According to the mode of the currently occurred error, macroblock header and other control variables are set by software.

The above mentioned other control variables include a variable for representing that a specific hardware is to be operated by error concealment mode and a variable for representing whether the DC coefficient of the current macroblock can be used in the macroblock located at the adjacent lower row.

This process is for preventing the currently recovered error from successively propagating to the adjacent next row.

The types of error occurring and the concealing methods are as follows:

First, in case that no error is detected in the current input data packet, second, in case that an error is detected at the second part texture but normal decoding is possible by the localization process on the error in data packet, and third, in case that a texture error occurred, the current frame is INTRA, no decoded DC coefficient exists, and it is possible to use the DC coefficient of the adjacent upper block, the error concealment is being carried out by bringing the DC coefficient of the adjacent upper block. However, the macroblock header and the control variables recovered by this process have to be prohibited to be refered by the adjacent lower macroblock for DC coefficient consulting.

Fourth, in case that a texture error occurred, the current frame is INTRA, no decoded DC coefficient exists, and it is impossible to use the DC coefficient of the adjacent upper block, the macroblock is replaced by the macroblock of the previous frame at the same location.

Fifth, in case that a texture error occurred, the current frame is INTRA, and DC coefficients exist, only the DC coefficient decoding is being carried out.

Sixth, in case that a texture error occurred, and the current frame is INTRA, then, since a motion vector always exists, bring the corresponding pixel data from the previous frame by using the motion vector.

Seventh, in case that an error is occurred in the second part header, the current frame is INTRA, no decoded DC coefficient exists, and DC coefficients exists in the adjacent upper macroblock, use the DC coefficients of the upper macroblock.

Eighth, in case that an error is occurred in the second part header, no decoded DC coefficient exists, and it is impossible to use the DC coefficient of the adjacent upper block, bring the pixel data from the previous frame at the same location.

Ninth, in case that an error is occurred in the second part header, the current macroblock is INTRA, and DC coefficients exist, decoding is being carried out by using the DC coefficient only.

Tenth, in case that an error is occurred in the second part header, and the current frame is INTER, then, since a motion vector exists, bring the corresponding pixel data from the previous frame by using the motion vector.

Eleventh, in case that an error is occurred in the first part, the current frame is INTRA, and it is possible to use the DC coefficient of the adjacent upper block, and twelfth, in case that an error is occurred in the first part, the current frame is INTRA, and it is impossible to use the DC coefficient of the adjacent upper block, bring the pixel data from the previous frame at the same location.

Thirteenth, in case that an error is occurred in the first part, and the current frame is INTER, if the macroblock, that is currently being processed, is INTRA, then decode by using the pixel data of the same location of the previous frame, on the other hand, if the macroblock, that is currently being processed, is INTER, then extract a motion vector by using the error concealment function of the macroblock and decode by using the pixel data of the corresponding location of the previous frame.

Figure 14:
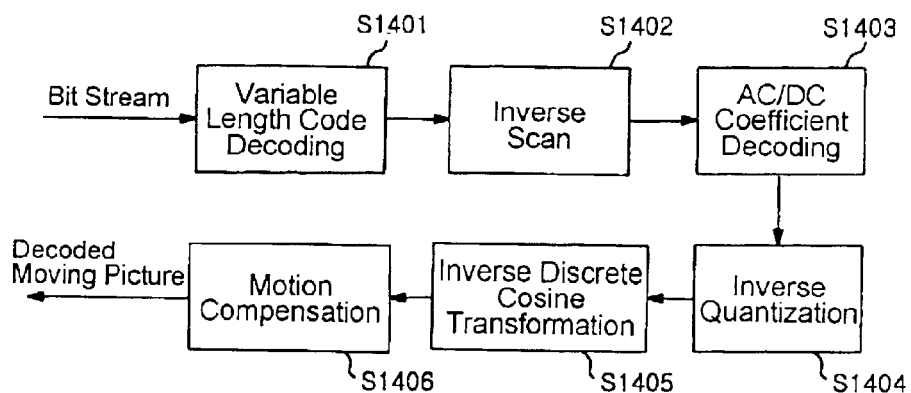
FIG. 14 is a flow chart illustrating the generally used moving picture decoding procedures.

FIG. 14 shows a sequence of moving picture texture decoding process of MPEG-4.

The step(S1401) of variable length code decoding is a step which decodes a variable length coded bit stream and outputs an AC/DC predicted discrete cosine transformation (DCT) coefficient.

The step(S1402) of inverse scan is a step which carries out a zigzag scan, a horizontal scan or a vertical scan on the output of the AC/DC predicted DCT coefficient of the step(S1401) by a block unit of 8×8 pixels according to the direction of AC/DC coefficient prediction and the existence of AC/DC coefficient prediction.

The step(S1403) of AC/DC coefficient decoding is a step which carries out an inverse AC/DC coefficient prediction.

By the steps of inverse quantization(S1404) and inverse DCT(S1405), a moving picture data on frequency domain is converted into that on spatial domain.

By adding the output of the step(S1405) and the predicted moving picture data, based on the motion vector and the previous frame decoding result, in the step(S1406) of motion compensation, a decoded moving picture is finally outputted.

All the steps described above are carried out by a block unit comprising at least 8×8 pixels, and ADR(203e) carries out the step(S1403).

ADR(203e) is connected to the coprocessor bus(202) via DSCU(203a), and if necessary, it can read/write ADR memory or registers at RISC processor(207).

In addition, ADR(203e) informs DSCU(203a) the situation when the operation on one block is completed. VLD (203ba)(or RVLD(203bb)) informs the number of maximum row required for ADR(203e) operation(the factor indicating the number of row up to which a coefficient not being '0' exists in the 8×8 block), and at the same time, passes over the prediction direction of next block to VLD(or RVLD).

Figure 15:
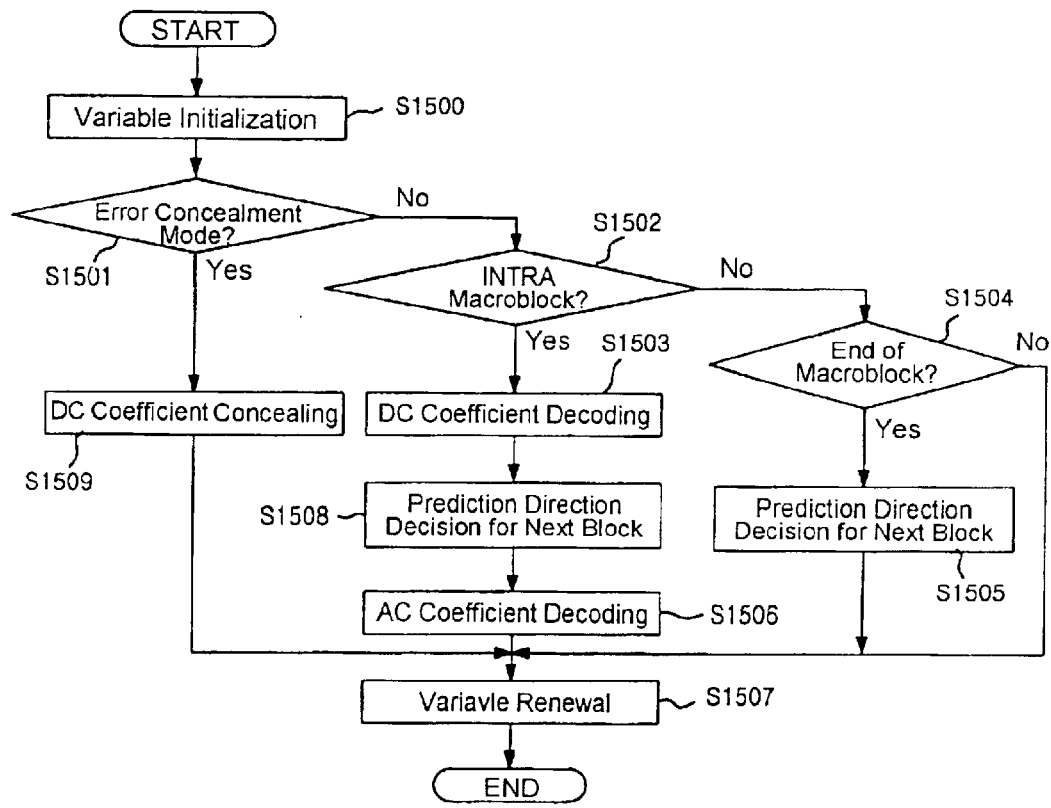
FIG. 15 is a flow chart illustrating the error concealment processing procedures in accordance with the present invention.

FIG. 15 is a flow chart illustrating the operation sequences of ADR(203e).

Variables required for AC/DC coefficient decoding for a block are initialized at the step(S1500).

In the step(S1501), judging whether the ADR(203e) of current macroblock is being operated by error concealment mode, and if so, carry out the step(S1509), or else, carry out the step(S1502).

A user selects the step(S1501) by program.

The step(S1509) conceals the DC coefficient, and it carries out copying the DC coefficient of the upper adjacent block into the DC coefficient of current block.

In the step(S1502), judging the type of macroblock to which the current block belongs, if it is INTRA, carry out the step(S1503), or else(i.e. if it is INTER), carry out the step(S1504).

DC coefficient is decoded in the step(S1503), and the prediction direction of the next block is decided in the steps(S1508 & S1505).

The reason for deciding the prediction direction of the next block is that the information on the prediction direction of the next block is also required for the step of inverse scan(S1402 in FIG. 14), which is carried out before AC/DC coefficient decoding of next block.

AC coefficient is decoded in the step(S1506), and the variables required for AC/DC coefficient decoding of next block is renewed in advance in the step(S1507).

If the type of macroblock to which the current block belongs is INTER in the step(S1502), the step(S1504) is carried out. And thereafter, the prediction direction of next block is being decided(S1505).

This is because INTRA macro block, i.e. the block requiring the prediction direction information, could be coming after INTER macroblock.

IQ(203cb) of VDEC(203) carries out an inverse quantization whenever IDCT(203ca) reads a DCT transformed coefficient from DEC memory(203f).

Especially, different from H.263, a mismatch control is being carried out when a quantized data by MPEG-4 method is inputted. As a result, the value of the $64^{th}$ coefficient in one block could be different from the initial input value. In this case, inform the change to IDCT(203ca) and MC(203d).

Figure 16:
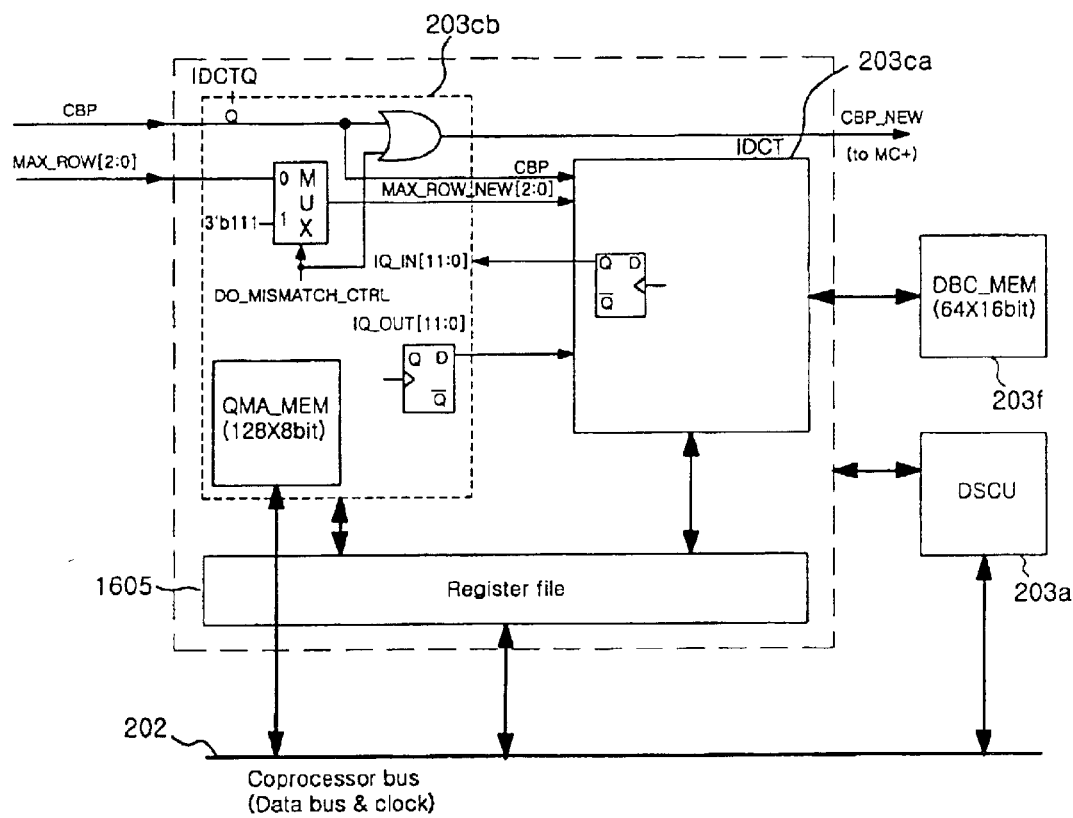
FIG. 16 is a view illustrating the structure of an inverse discrete cosine transformer(IDCT) and an inverse quantizer (IQ) in accordance with the present invention.

FIG. 16 is a view illustrating the structure of the interface between IQ and IDCT.

IQ(203cb) receives a processed data from IDCT(203ca), carries out an inverse quantization, and outputs the result at the very next clock.

Particularly in case of carrying out a mismatch control, the value of DO_MISMATCH_CTRL changed to be '1' when the last coefficient of the $MAX\_ROW^{th}$ row is outputted. And thus, the value of MAX_ROW_NEW transferred to IDCT(203ca) is changed to be '7'.

IDCT(203ca) checks the value of MAX_ROW_NEW whenever the one-dimensional inverse DCT and inverse quantization are completed for each line, and continually carries out the one-dimensional inverse DCT until the number of current row becomes to be same as MAX_ROW.

In addition, if the value of DO_MISMATCH_CTRL is '1', the value of CBP_NEW unconditionally becomes to be '1'. And this value is provided to be the value of CBP(Coded Block Pattern) required for motion compensation of MC(203d).

The unexplained numeral 1605 represents a register file.

Figure 17:
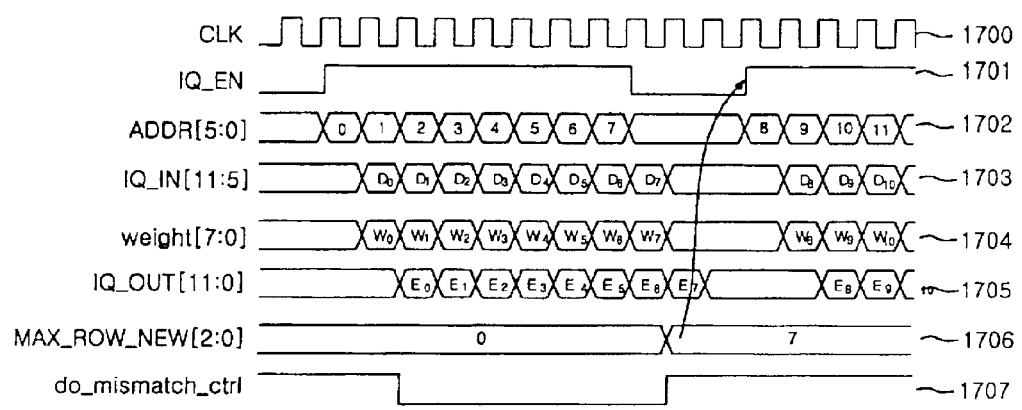
FIG. 17 is a view illustrating an example of mismatch processing procedures in accordance with the present invention.

FIG. 17 shows an example of the operation being carried out in IQ(203cb).

CLK(1700) is an operation clock internally used in IQ(203cb), and IQ_EN(1701) is an enable signal for controlling the operation of IQ(203cb).

ADDR(1702) is an address for representing the coefficient location of a block, and IQ_IN(1703) is data inputted to IQ(203cb).

weight(1704) is a weight value used for inverse quantization, and IQ_OUT(1705) is output data of calculation result.

MAX_ROW_NEW(1706) is the value of new row, which is renewed by the value of MAX_ROW(This value represents the number of rows containing non-zero coefficient at current block.) outputted from VLD(203ba) without a mismatch control being carried out after the calculation for 64 coefficients is finished.

In normal mode, IDCT(203ca) unconditionally carries out an inverse quantization and an one-dimensional inverse DCT on the first row of the coefficients of a block.

And then, if the number of current row is smaller than MAX_ROW_NEW(1706), it carries out an inverse quantization and an one-dimensional inverse DCT on the next row.

By carrying out an one-dimensional inverse DCT up to the value of MAX_ROW_NEW(1706) like described above, the power consumption by IDCT(203ca) can be reduced.

As described in FIG. 17, the initial value of MAX_ROW_NEW(1706) is '0'. IQ(203cb) renews the signal, do_mismatch_ctrl(1707), by combining the calculation result of inverse quantization on the first row and the MAX_ROW value inputted from VLD.

A mismatch control can be carried out basically after all the 64 coefficients are completely calculated, however, since VLD(203ba) outputs the number of row, containing non-zero coefficient, of the current block, a mismatch calculation can be carried out in advance by using this value.

Here, the value of the 64$^{th}$ coefficient of a block can be changed according to the calculation result being even or odd. Therefore, if the result is even, carry out an inverse quantization on all the rest rows, and on the contrary, if the result is odd, terminate the calculation at current stage.

Figure 18:
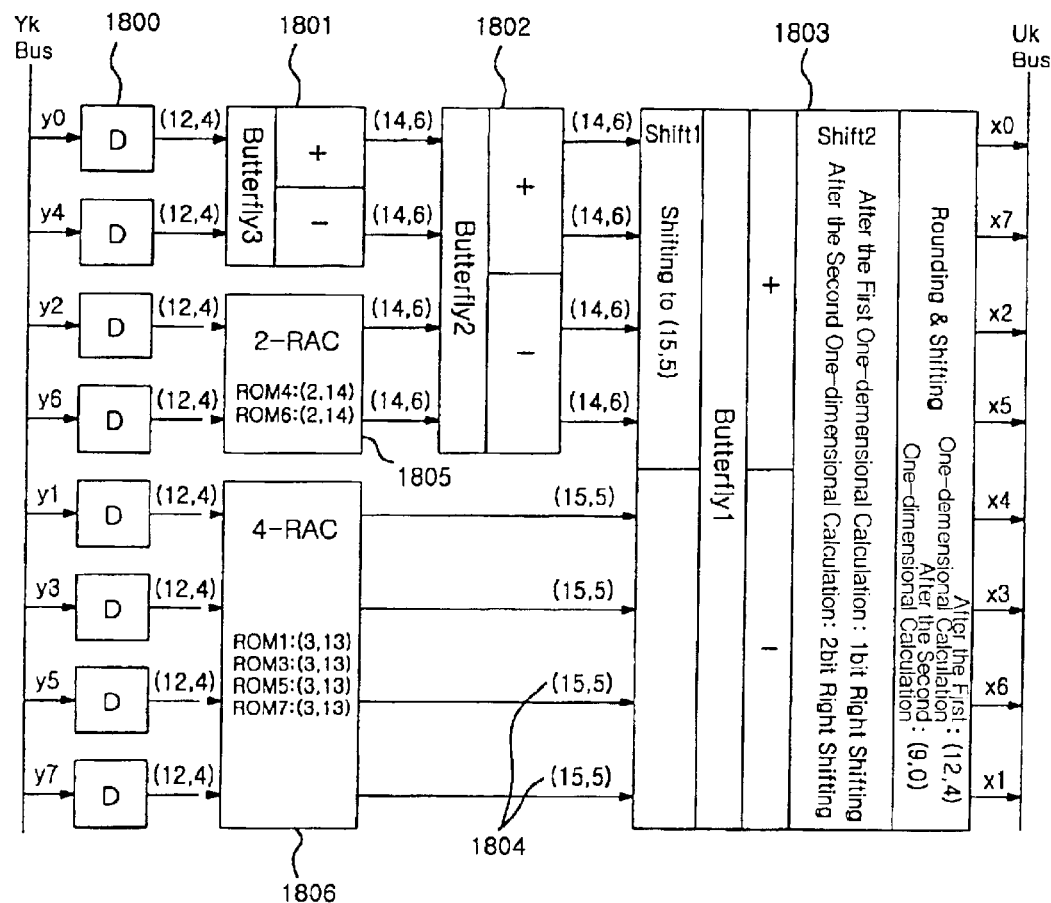
FIG. 18 is a block diagram of an inverse discrete cosine transformer(IDCT) in accordance with the present invention.

FIG. 18 is a view illustrating the procedures of carrying out an inverse quantization on all the rest rows, in case that the calculation result in IQ_OUT(1705) signal is even, according to the above described condition.

IDCT(203ca) of VDEC(203) converts a moving picture signal on frequency domain, which is represented by brightness and color difference, into a signal on time domain.

FIG. 18 is a block diagram illustrating the structure of one-dimensional IDCT.

For actually completing the inverse DCT of moving picture data, by successively carrying out an one-dimensional inverse DCT described in FIG. 18 twice, a two-dimensional inverse DCT is achieved.

Data latch(1800) is a data latch for storing the data inputted from IDCT(203ca), and used as an address for accessing a ROM table in case of being inputted to ROM accumulator(RAC; 1805, 1806).

Butterfly3(1801) carries out a butterfly calculation on y0 and y4 without a ROM table.

RAC(1805) carries out a distributed arithmetic calculation on y2 and y6 using two ROM tables, and RAC(1806) carries out a distributed arithmetic calculation on y1, y3, y5 and y7 using four ROM tables.

Butterfly2(1802) carries out the second butterfly calculation by using the output data values from Butterfly3(1801) and RAC(1805).

The calculation section(1803) compensates both the output of RAC(1805) and the output of Bytterfly2(1802) to have the same accuracy and carries out a compensation for an error possibly occurred through the calculations of Butterfly3(1801), Butterfly2(1802) and RAC(1805).

In addition, it carries out a rounding/clipping operation for using the result of the first one-dimensional inverse DCT as the input for the following second one-dimensional inverse DCT.

The calculation section(1803) is also used for the same purpose in the following second one-dimensional inverse DCT calculation.

The digit(1804) represents the integer digit and the below decimal point digit of data outputted from each calculation block.

Figure 19:
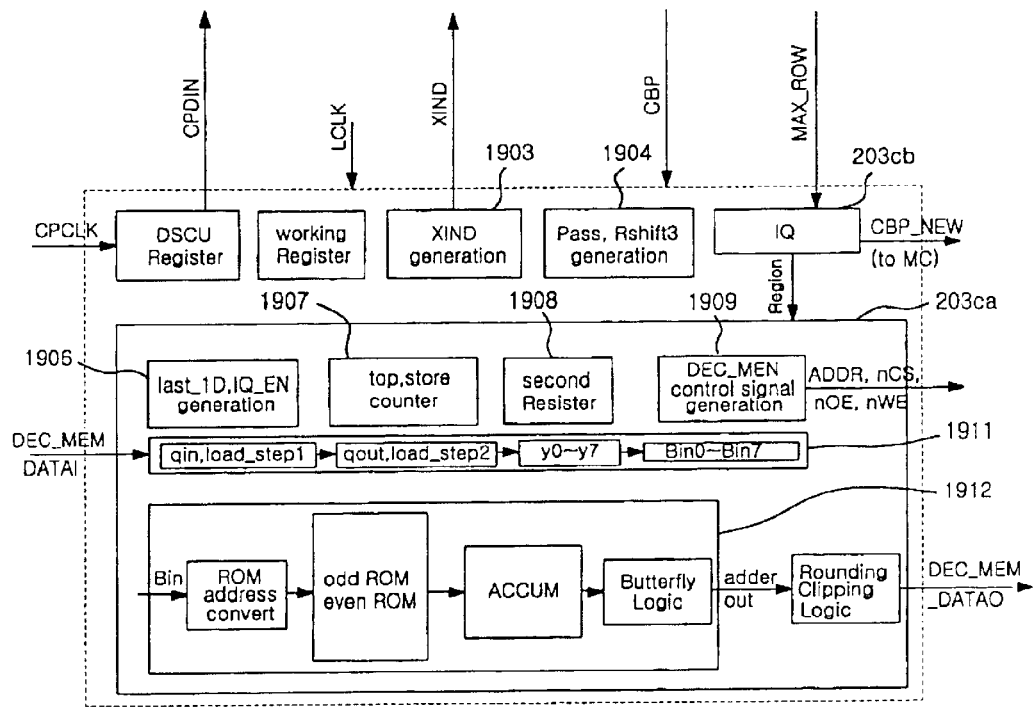
FIG. 19 is a view illustrating the data stream by using IDCT and IQ in accordance with the present invention.

FIG. 19 is an overall block diagram of IQ(203cb) and IDCT(203ca).

XIND generation section(1903) is a circuit for generating XIND signal when the two dimensional inverse DCT is completed.

The condition decision section(1904) is a block for deciding the condition for carrying out an inverse DCT. In case that the current macroblock is INTER and CBP=0, it means that an inverse DCT can be omitted. In addition, in case that the current macroblock is INTRA and CBP=0, or in case of H.263 quantization mode, it means that only the right shift can be carried out on the input data.

IQ(203cb) carries out an inverse quantization as described above and renews the CBP value. The signal generation section(1906) generates a signal indicating that the first one-dimensional inverse DCT is completed, and additionally, generates a signal for controlling the inverse quantization operation interval.

The counter(1907) is a counter used for controlling the overall operation of IDCT(203ca) and controls the pipeline of basic IDCT(203ca).

The control signal generation section(1909) generates control signals required for accessing DEC memory(203f) for storing the calculation result of IDCT(203ca).

IDCT flow controller(1911) is a block for controlling the flow of the second one-dimensional inverse DCT. During the first one-dimensional inverse DCT, the data(the result outputted from VLD) stored in DEC memory(203f) is inputted to IDCT flow controller(1911), and the inverse quantization result on this data is stored in Qout.

During the second one-dimensional inverse DCT, IDCT flow controller(1911) uses the data stored in y0~y7 and Bin0~Bin7, and at the same time, runs through load_step1 and load_step2 to store the final result into DEC memory (203f).

RAC(1912) is a block used for distributed arithmetic calculation and includes the Butterflies(1801, 1802) described in FIG. 18.

In an inverse DCT calculation, a series of processes of [data load→inverse DCT→data store] is being carried out. If we assume that each step requires 16 cycles, the total required cycles of two-dimensional inverse DCT for processing 64 pixels, which are corresponding to one block data, become 320.

So, when processing a moving picture data having a QCIF size, in order to process the moving picture with the speed of 15 frame/sec, the number of required inverse DCT calculation cycle becomes 2,851,200.

In the prior art, to reduce the large amount of calculation, a method of omitting the inverse DCT has been used by using the information of CBP=0 for the cases when all the coefficients generated by inverse DCT are '0' in case of INTER macroblock or all the rest values except DC coefficient are '0' in case of INTRA macroblock.

In fact, however, the calculation amount can be reduced more by using the characteristic that the coefficient values inputted from a moving picture coding sector are not uniformly distributed in the whole 64 pixel data but, due to the characteristic of DCT, massively distributed on upper left section, which is the low frequency domain.

In the prior art, methods for minimizing the amount of calculation and power consumption by using the above described characteristic have been proposed in the moving picture encoding device technology, however, these methods have disadvantages that the display quality is degraded by coding a non-zero coefficient to be zero and the control circuit deciding the range of DCT calculation becomes to be complicated.

For reducing the amount of calculation of IDCT(203ca) without display quality degradation by using the characteristic of the data transmitted through DCT being massively distributed in low frequency domain, IDCT(203ca) in FIG.

19 provides functions of inverse scan, DC/AC coefficient prediction, and regional inverse DCT using the internal mismatch control circuit of IQ(203cb).

Figure 20:
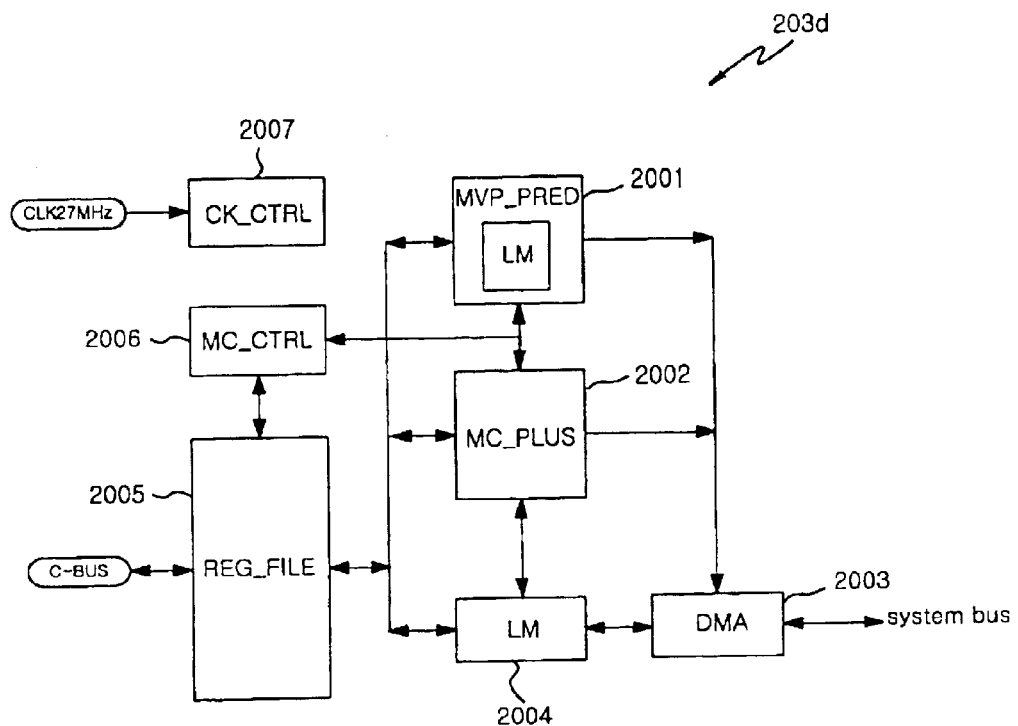
FIG. 20 is a view illustrating the structure of a block for motion compensation in accordance with the present invention.

FIG. 20 is a view illustrating the structure of motion compensator(MC; 203d) in VDEC(203).

MC(203d) carries out a motion compensation by using the data and the motion vector outputted from IDCT(203ca).

MVP_PRED(2001) is internally equipped with a 48×9 local memory(LM). It extracts the intermediate value among the values of motion vectors of the three blocks(or macroblock) adjacent to the current block(or macroblock) as a value of prediction motion vector, adds this value to the value of the inputted motion vector difference, and thereby calculates the final value of motion vector.

At this time, the local memory(LM) stores the values of motion vectors of adjacent blocks.

Another local memory(2004) is used for storing the calculation result of current block or a reference block and has a size of 72×8 bits.

REG_FILE(2005) receives the control and operation mode related data from RISC processor(207) and controls the state register value to be read by RISC processor(207).

MC_CTRL(2006) controls overall operation for motion compensation and divided into the following 4 operation modes:

In the first mode, it uses the motion vector value of the very upper macroblock for obtaining the current motion vector or receives the data of a reference block from the previous frame by setting the value of motion vector to be '0', and stores the result as a calculation result of current block.

In the second mode, it receives the data of a reference block from the previous frame by setting the value of motion vector to be '0' and store the value as a current block data.

In the third mode, it stores the current IDCT result as a current block data without receiving the reference block data.

In the fourth mode, it is classified to be 4MV or UMV (Unrestricted Motion Vector) according to the operation mode. It calculates a prediction motion vector of current block and adds this value to the inputted motion vector difference value to obtain the final motion vector.

And based on this, it finds out the reference block, and by combining with the result of inverse DCT, it stores the result as a final current block data value.

MC_PLUS(2002) carries out adding the reference block data to the inverse DCT result of current block, and additionally, carries out a half-pixel unit interpolation.

DMA(2003) receives the reference block data from an external memory and stores the calculated data of current block.

Here, the basic unit of read/write is 8 pixels or 9 pixels, and read/write by this unit is repeated by 8 or 9 times.

As mentioned thereinbefore, a moving picture decoding processor in accordance with the present invention improves the overall system efficiency by providing the structure of: a programmable moving picture decoding processor based on RISC processor; three separate bus structure for minimizing external memory access which used to be one of the major problem of moving picture decoding process; and enabling independent operation by forming a moving picture processing block to be a coprocessor structure. Therefore, a moving picture decoding processor in accordance with the present invention can be used as a main processor of a terminal for wired and/or wireless moving picture decoding such as H.263 and MPEG-4. In addition, it can be optimized for various programmable application fields. Furthermore, the future upgrade, in which each block is constructed by main processor and independent modules, can be easily achieved.

As mentioned before, the present invention presents a moving picture decoding processor, based on RISC processor, having a separate bus structure for minimizing memory access, which is applicable to a video phone, a remote surveillance system, a wireless VOD terminal, a PDA, a $V^2$oIP terminal, and an IMT-2000 terminal. Especially, it can provide optimized systems for various application fields by using the programmable structure.

Since those having ordinary knowledge and skill in the art of the present invention will recognize additional modifications and applications within the scope thereof, the present invention is not limited to the embodiments and drawings described above.

What is claimed is:

1. A moving picture decoding processor for multimedia signal processing comprising:

a control means for carrying out an overall control on decoding process of compressed moving pictures inputted from exterior;

a decoding means for decoding moving pictures;

a post processing means for carrying out an appropriate post processing on decoded moving picture signals according to the output device connected to exterior;

a first interfacing means between said decoding means and an external memory;

a second interfacing means between said post processing means and said external memory;

a third interfacing means between peripheral devices and said external memory;

an external memory control means for controlling said external memory;

a fourth interfacing means between a local bus and a main bus; wherein said local bus is connected to said peripheral devices and buses for connecting said components respectively.

2. A moving picture decoding processor for multimedia signal processing as claimed in claim 1, characterized in that said decoding means and said post processing means are constituted of coprocessors being operated independently from said control means.

3. A moving picture decoding processor for multimedia signal processing as claimed in claim 1, characterized in that the functions of command transfer and control between said control means and said decoding means or said post processing means are interfaced through an independent coprocessor bus.

4. A moving picture decoding processor for multimedia signal processing as claimed in claim 1, characterized in that said control means is equipped with a instruction/data cache so that it can store a program required for system control without an extra memory.

5. A moving picture decoding processor for multimedia signal processing as claimed in claim 1, wherein said decoding means comprising:

a VLD(Variable Length Decoder) and an RVLD (Reversible Variable Length Decoder) for decoding the data compressed by Huffman coding;

an MC(Motion Compensator) for carrying out a motion compensation;

an IDCT/IQ(Inverse Discrete Cosine Transformer/Inverse Quantizer) for decoding compressed moving picture coefficient into time-domain coefficient and carrying out an inverse quantization;
a coefficient reconstructor for decoding the compressed data by AC/DC coefficient prediction;
a decoding memory for commonly being used for said components; and
a decoder state control unit for controlling the sequence of said components.

6. A moving picture decoding processor for multimedia signal processing as claimed in claim 5,
characterized in that said decoder state control unit controls overall sequence for decoding the block-unit pixel data by using the information interpreted by control means by frame unit and systematically controls a sequential pipeline connected in sequence of VLD, IDCT, and MC.

7. A moving picture decoding processor for multimedia signal processing as claimed in claim 5,
characterized in that said VLD and said RVLD decode the Huffman-coded input data by a code unit in forward direction and backward direction respectively.

8. A moving picture decoding processor for multimedia signal processing as claimed in claim 5,
characterized in that said IDCT/IQ inversely converts the input data coded in frequency domain into time domain data, carries out an inverse quantization, and carries out a regional inverse discrete cosine transformation(DCT) using the information on the coefficient characteristic received from VLD for minimizing the amount of calculation required for moving picture processing.

9. A moving picture decoding processor for multimedia signal processing as claimed in claim 5,
characterized in that said MC produces a final motion vector by a prediction value obtained by using the inputted motion vector difference value and the motion vector of adjacent macroblock, finds out the relative location of the previous frame using the calculated motion vector, reads pixel data of corresponding location, uses said data for decoding current block, and carries out a necessary error concealment function by receiving the mode and condition of the occurred error from said control means.

10. A moving picture decoding processor for multimedia signal processing as claimed in claim 9,
characterized in that said process of reading the data of the previous frame or current frame from external memory is being carried out independently from the operations of the other components of said decoding means.

11. A moving picture decoding processor for multimedia signal processing as claimed in claim 5,
characterized in that said decoding memory stores intermediate data required for decoding moving picture data and temporarily stores the previous frame data.

12. A moving picture decoding processor for multimedia signal processing as claimed in claim 1,
characterized in that said post processing means carries out the functions of:
on-screen display(OSD) for displaying additional characters with moving picture simultaneously;
deblocking filter for deblocking filtering on decoded moving picture;
display control for generating appropriate control signal according to the type of external output device;
interfacing with an external digital output device; and
interpolation filter for carrying out an interpolation on decoded moving picture.

13. A moving picture decoding processor for multimedia signal processing as claimed in claim 1,
characterized in that said control means, said decoding means, said post processing means, said fourth interfacing means, said third interfacing means, and said external memory control means are interfaced through an independent main bus respectively.

14. A moving picture decoding processor for multimedia signal processing as claimed in claim 1,
wherein said peripheral devices comprising:
a host interface for providing an interface with an external host processor;
a WDT(Watch Dog Timer) for controlling software reset;
a timer for providing count up/down;
an ICU(Interrupt Control Unit) for processing various interrupts inputted from exterior;
a PLL(Phase Locked Loop) for supplying clock to interior;
a GPIO(General Port Input Output) for being used for a general input/output port on system application;
an IIC(Inter IC Controller) for providing an interface with an external video encoder/decoder;
an IIS(Inter IC Sound Interface) for audio interface;
a UART(Universal Asynchronous Receiver/Transmitter) working as a universal serial communication port; and
an SPI(Serial Port Interface) for providing multichannel serial communication and being operated on master mode or slave mode.

15. A moving picture decoding processor for multimedia signal processing as claimed in claim 14,
characterized in that each of said components of said peripheral devices is interfaced through a peripheral device control bus independently being operated with the other bus.

16. A moving picture decoding processor for multimedia signal processing as claimed in claim 1,
characterized in that said control means, said first interfacing means, said second interfacing means, and said third interfacing means are carrying out the functions of master to the main bus, and said fourth interfacing means and said external memory control means are carrying out the functions of slave to the main bus.

17. A moving picture decoding processor for multimedia signal processing as claimed in claim 1,
characterized in that said control means interprets the information on various header and the upper macroblock, which is included by frame unit during a moving picture decoding process, by software.

18. A moving picture decoding processor for multimedia signal processing as claimed in claim 1,
characterized in that an external program is downloaded to said control means, through said host interface that provides an interface with said external host processor which is system booting done simultaneously with.

19. A moving picture decoding processor for multimedia signal processing as claimed in claim 1 or 18,
characterized in that an external program downloaded to said control means is received from an external program memory through the main bus by using said external memory control means.

20. A moving picture decoding processor for multimedia signal processing as claimed in claim 1,
characterized in that said decoding means receives a command through said coprocessor bus by using said control means, and at this time, it interfaces with said control means by handshaking.

21. A moving picture decoding processor for multimedia signal processing as claimed in claim 3,
characterized in that a bus operation between said coprocessor bus and said main bus is controlled by said control means.

22. A moving picture decoding processor for multimedia signal processing as claimed in claim 15,
characterized in that an operation control between said peripheral device bus and said main bus is carried out through said fourth interfacing means.

* * * * *